No. 839,776. PATENTED DEC. 25, 1906.
G. L. LEWIS.
JEWELER'S CHUCK.
APPLICATION FILED MAR. 27, 1905.
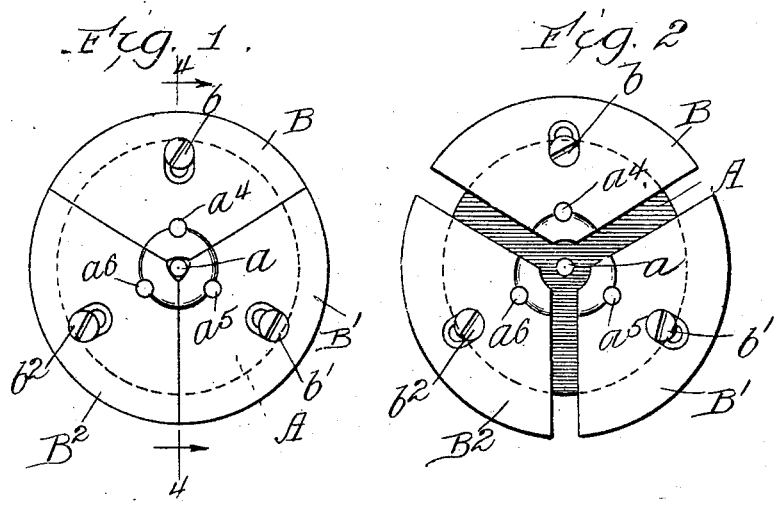
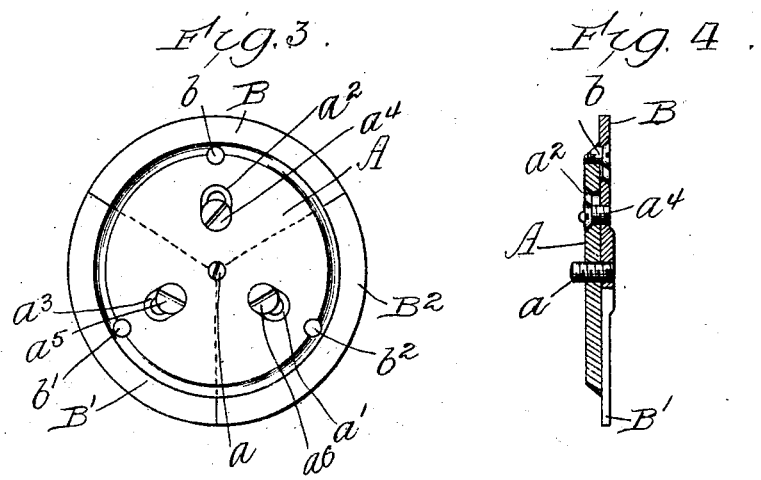
Witnesses:
Ray White.
Harry R. LeMule
Inventor:
George L. Lewis,
By Charles R. Hill, Atty

UNITED STATES PATENT OFFICE.

GEORGE L. LEWIS, OF WEST PULLMAN, ILLINOIS.

JEWELER'S CHUCK.

No. 839,776.        Specification of Letters Patent.        Patented Dec. 25, 1906.

Application filed March 27, 1905. Serial No. 252,211.

*To all whom it may concern:*

Be it known that I, GEORGE L. LEWIS, a citizen of the United States, and a resident of the city of West Pullman, in the county of Cook and State of Illinois, have invented certain new and useful Improvements in Jewelers' Chucks; and I do hereby declare that the following is a full, clear, and exact description of the same, reference being had to the accompanying drawings, and to the letters of reference marked thereon, which form a part of this specification.

This invention relates to jewelers' chucks, and more particularly to that class of chucks designed to be secured in a lathe-chuck—as, for instance, a wheel-chuck—and used for operation upon jewels.

Heretofore in many of the operations upon jewels and other very small parts or mechanisms necessarily manipulated by jewelers difficulty has been found in securing a chuck capable of holding the parts with sufficient precision to enable the work to be done with accuracy and despatch. In manipulating jewels particularly the utmost skill and precision is required; otherwise a jewel may be improperly fitted or actually rendered useless, owing to the use of imperfect tools.

The object of this invention is to afford a chuck adapted to center the jewel exactly at the center of rotation and to afford a construction in which the jewel can be set to the desired point as to depth.

It is also an object of this invention to afford a chuck having protruding jaws in the center, enabling the operator to have access to all parts of the jewel operated upon more readily than has heretofore been possible.

The invention consists in the matters hereinafter described, and more fully pointed out and defined in the appended claims.

In the drawings, Figure 1 is a front elevation of a device embodying my invention, showing the chuck closed. Fig. 2 is a similar view showing the chuck fully opened. Fig. 3 is a rear elevation of the same with the chuck closed. Fig. 4 is a section taken on line 4 4 of Fig. 1.

As shown in the drawings, A indicates a back plate circular in form and having threaded therein at its center a set-screw $a$ and also, as shown, having disposed at equal distances apart intermediate its center and periphery three raidal slots, (indicated as $a'$, $a^2$, and $a^3$.) Secured on the front flat face of said plate or disk are three sectors B, B', and B², each, as shown, comprising a relatively thin plate of metal affording a sector of one hundred and twenty degrees and adapted each to fit closely to the other, as shown in Figs. 1 and 3, and, as shown, provided with a radial slot intermediate its periphery and center, through which extends set-screws, (indicated by $b$, $b'$, and $b^2$,) which engage in the back plate A near its periphery, as shown in Fig. 3. As shown also, set-screws $a^4$, $a^5$, and $a^6$ extend through the corresponding slots in the back plate A and engage in the respective jaws of the chuck near the inner ends of the same. The inner end or jaw of each of said chuck members B, B', and B², as shown, is thickened and projects slightly outwardly, thus affording a sufficiently thick plate to firmly engage the jewel or other part therein, and, as shown, said jaws are shaped at their gripping-faces or at the center of the chuck to afford gripping-faces of relatively large curvature, thus enabling the same to grip and firmly hold either a very small article when the jaws are brought closely together, as shown in Figs. 1 and 3, or a larger article when the jaws are separated, as shown in Fig. 2.

The operation is as follows: When the jewel or other article is inserted in the jaws, the set-screw $a$ is set up to afford the desired depth within the chuck, and the jewel or other desired article is placed thereon. The jaws are then set up to the jewel or other device, firmly gripping the same, and are rigidly secured in place by setting up the screws in the back plate and in said jaws, respectively. The device is then set in a wheel-chuck or other lathe-chuck adapted to rotate the same and which engages the periphery of the jaws, still further gripping the same into binding engagement with the article held therein. The shape of the jaws is such as to carry the face of the jewel or article held therein outwardly beyond the plane of the jaws, thus affording an opportunity for the operator to reach his work not only at the front and at the sides, but even at a slight rearward inclination. The construction is such also, owing to the slots in the back plate and in the jaws, that the said jaws can only move radially inwardly and outwardly, thus of necessity engaging the device to be held therein with the utmost precision.

Obviously I have shown but one construction embodying my invention, and I do not purpose limiting this application for patent otherwise than necessitated by the prior art, as many details of construction may be varied without departing from the principle of my invention.

I claim as my invention—

1. The combination with a back plate having a central set-screw tapped therein and radial slots disposed at equal distances apart in said back plate and jaws slidable on the front of said back plate and also slotted radially, set-screws engaged in said back plate and jaws and each extending through slots in the other, thereby guiding said jaws radially.

2. In a chuck, the combination with a circular back plate, of a central set-screw therein, jaws slidable radially on the face of said plate and set-screws in the jaws and in the plate each extending in slots through the other.

3. The combination with a circular back plate having a plain face, of a set-screw tapped into the middle of the same, radially-movable jaws slidable on said plate and adapted to meet around said set-screw radial slots in said back plate and in the jaws and set-screws engaged in each and extending into the slots of the other.

4. In a chuck the combination with a circular back plate having a set-screw tapped into the middle of the same, and extending through the front, of three interfitting jaws slidable radially on the face of the plate and thickened at their gripping ends and longer than a radius of the back plate and at their outer edges shaped to be engaged in a lathe-chuck.

5. In a chuck the combination with a circular disk having a central aperture therethrough and a plurality of concentrically-arranged slots therein, a plurality of radially-slotted sector-jaws adjustably engaged thereon having thickened gripping ends adapted to firmly hold a jewel therebetween, means for regulating the depth of the jewel and means firmly holding said disk and slotted sectors together.

6. In a device of the class described the combination with a back plate having a plurality of concentrically-arranged slots therein, a plurality of sectoral jaws slidable on said back and having slots therein, screws engaging in said back and sectoral jaws and projecting through the slots in said back and sectoral jaws and means on said plate whereby the depth of the article seated thereon is regulated.

7. In a chuck a combination with a back plate of radially-movable sector-shaped jaws thereon of greater length than a radius of the plate, a plurality of radial slots in said plate near the center thereof, a slot in each jaw near its periphery, a set-screw in each slot engaging said plate and jaws together, a curved thickened inner end on each jaw and an adjusting-screw at the axis of the plate.

In testimony whereof I have hereunto subscribed my name in the presence of two subscribing witnesses.

GEORGE L. LEWIS.

Witnesses:
CHARLES W. HILLS,
W. W. WITHENBURY.